The specification in this patent
is not in print.
6774X
P. Willcox.
Domestic Oven.
Patented Sept. 28, 1831.
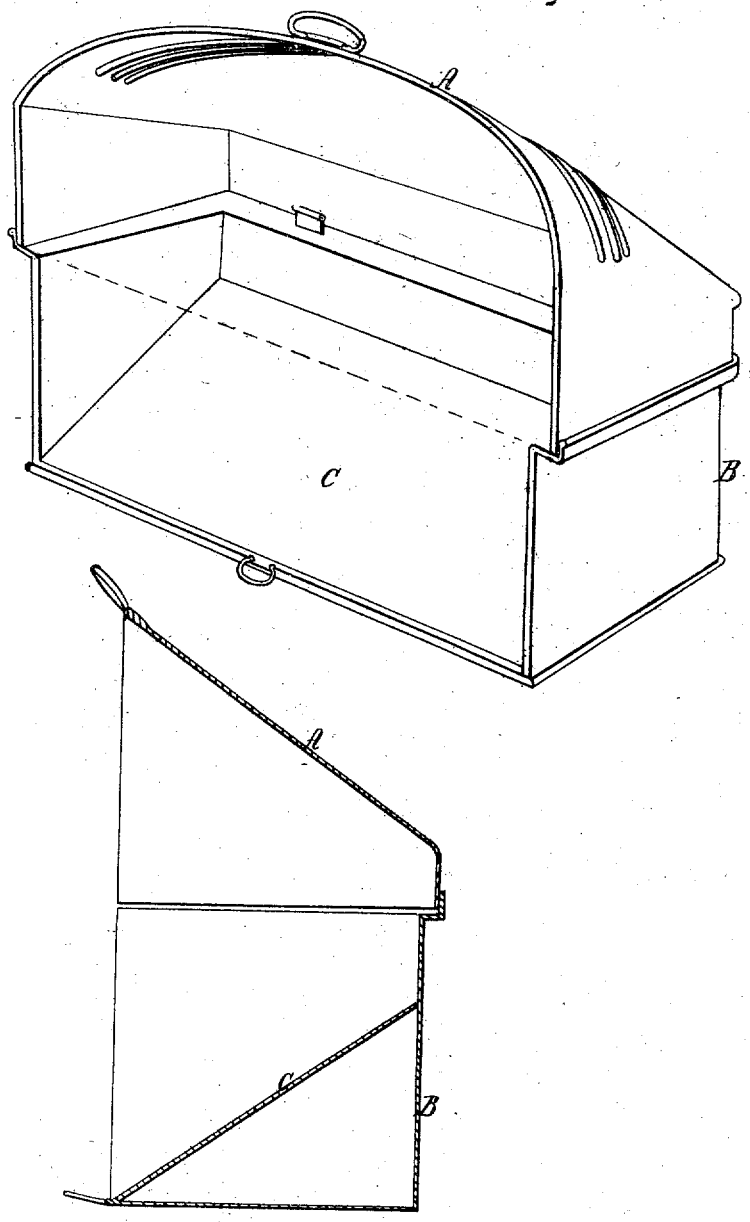
THE NORRIS PETERS CO., WASHINGTON, D. C.

Sept 28 1831 6774X 47.

Philip Willcox of Springfield Massachusetts.

Letters Patent

The schedule referred to in these Letters Patent and making part of the same, containing a description in the words of the said Philip Willcox himself of his improvement in the apparatus called the Economical Baker and Roaster To all to whom these presents shall come, Be it known that I Philip Willcox of Springfield in the County of Hampden & State of Massachusetts, have invented a new and useful improvement in the mode of baking and roasting & that the following is a full and exact description of the construction and operation of the machine or apparatus as improved by me, and called the Economical Baker & Roaster The machine or apparatus consists of two parts A & B A, is a reflector made of tin and has heretofore been in use, B is a box or case upon which the reflector A, containing the article to be baked in pans or platters, is placed; and is made of sheet iron, It is in form as represented in the accompanying plan or drawing open in front, C, is a sheet of tin, fitted into the box or case so as to make an angle of about 45 degrees, it is moveable and may be turned when necessary or replaced by new sheets of similar size, the object being to present a smooth bright surface to the action of the fire which is thus reflected, in such a manner as to act upon the articles to be baked directly above The whole apparatus is placed before a common fire, the heat from which, reflected above and below, acts equally and uniformly upon the substance to be baked, The only exposed part of the case or box B. which is open, is the front side, to receive the reflector. The side behind and the ends, being closed, the Drawing [illegible]

cold air is prevented from passing under the reflector, and thereby diminishing the action of the heat.

In this particular and in the sheets of tin being moveable, consists the difference between this apparatus and any other now in use.. The same apparatus is used for the purpose of roasting by removing the pans or platters for baking and the reflector C, and by inserting a spit at E & F in the case or box B, and placing a dripping pan D. at the bottom of the box as represented in the figure 2, and this arrangement has not heretofore been in use,

What I claim as new and for the use of which I ask an exclusive privilege consists of the two particulars above mentioned in the apparatus for baking, and the application of the same apparatus for the purpose of roasting exclusive of the spit

Witnesses
Lester Belden
Wm B. Calhoun

Philip Milroy 572 wds